(12) United States Patent
Al-Shalash et al.

(10) Patent No.: US 9,357,568 B2
(45) Date of Patent: May 31, 2016

(54) SYSTEM AND METHOD FOR ADAPTING AN APPLICATION SOURCE RATE TO A LOAD CONDITION

(75) Inventors: Mazin Al-Shalash, Frisco, TX (US);
Yunsong Yang, San Diego, CA (US);
Alok Kumar, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1062 days.

(21) Appl. No.: 12/816,329

(22) Filed: Jun. 15, 2010

(65) Prior Publication Data

US 2010/0318670 A1 Dec. 16, 2010

Related U.S. Application Data

(60) Provisional application No. 61/187,654, filed on Jun. 16, 2009.

(51) Int. Cl.
| | |
|---|---|
| G06F 15/16 | (2006.01) |
| H04W 76/02 | (2009.01) |
| H04L 29/06 | (2006.01) |
| H04W 28/02 | (2009.01) |
| H04W 88/18 | (2009.01) |

(52) U.S. Cl.
CPC .......... *H04W 76/02* (2013.01); *H04L 65/1016* (2013.01); *H04L 65/1069* (2013.01); *H04W 28/02* (2013.01); *H04W 88/181* (2013.01)

(58) Field of Classification Search
USPC ....................................................... 709/229
See application file for complete search history.

(56) References Cited

U.S. PATENT DOCUMENTS

| | | | |
|---|---|---|---|
| 5,963,548 A | 10/1999 | Virtanen | |
| 7,421,508 B2 * | 9/2008 | Hannuksela et al. | 709/231 |
| 7,734,909 B1 * | 6/2010 | Roush et al. | 713/154 |
| 7,899,025 B2 * | 3/2011 | Bi et al. | 370/349 |
| 8,018,955 B2 * | 9/2011 | Agarwal et al. | 370/401 |
| 8,027,328 B2 * | 9/2011 | Yang et al. | 370/349 |

(Continued)

FOREIGN PATENT DOCUMENTS

| | | |
|---|---|---|
| CN | 1197358 A | 10/1998 |
| CN | 1305687 A | 7/2001 |

(Continued)

OTHER PUBLICATIONS

"Vocoder Rate Adaptation for LTE," 3GPP TSG-RAN WG2 Meeting # 66-BIS, R2-093806, Ericsson, ST-Ericsson, AT&T, Jun. 29-Jul. 3, 2009, 6 pages, Los Angeles, CA, USA.

(Continued)

*Primary Examiner* — Hua Fan
(74) *Attorney, Agent, or Firm* — Slater Matsil, LLP

(57) ABSTRACT

A system and method for adapting an application source rate to a load condition are provided. A method for forming a connection includes receiving a service authorization request for service between the first device and the second device, requesting a formation of a first bearer at a first data rate between the first device and the second device, and determining if the first bearer was formed. The method also includes transmitting a first positive response if the first bearer was formed, forming a second bearer at a second data rate if the first bearer was not formed, and completing the connection. The service authorization request includes a request to establish a connection at the first data rate, and the second data rate is different from the first data rate.

12 Claims, 15 Drawing Sheets

(56) References Cited

U.S. PATENT DOCUMENTS

| | | | | |
|---|---|---|---|---|
| 8,027,354 | B1* | 9/2011 | Portolani et al. | 370/431 |
| 8,028,040 | B1* | 9/2011 | Hobbs et al. | 709/219 |
| 8,064,907 | B2* | 11/2011 | Gallagher et al. | 455/435.1 |
| 2002/0128017 | A1 | 9/2002 | Virtanen et al. | |
| 2002/0186657 | A1 | 12/2002 | Jain et al. | |
| 2006/0080407 | A1* | 4/2006 | Rengaraju | 709/219 |
| 2007/0239979 | A1* | 10/2007 | Berger et al. | 713/150 |
| 2008/0232376 | A1 | 9/2008 | Huang et al. | |
| 2009/0129342 | A1* | 5/2009 | Hwang et al. | 370/331 |
| 2009/0141625 | A1* | 6/2009 | Ghai et al. | 370/230 |
| 2009/0182778 | A1* | 7/2009 | Tormasov | 707/200 |
| 2009/0248845 | A1* | 10/2009 | Waltermann et al. | 709/223 |
| 2009/0268635 | A1* | 10/2009 | Gallagher et al. | 370/254 |
| 2009/0268722 | A1* | 10/2009 | Gallagher et al. | 370/352 |
| 2009/0270097 | A1* | 10/2009 | Gallagher et al. | 455/435.1 |
| 2009/0270098 | A1* | 10/2009 | Gallagher et al. | 455/435.1 |
| 2009/0270099 | A1* | 10/2009 | Gallagher et al. | 455/435.1 |
| 2009/0316656 | A1* | 12/2009 | Zhao et al. | 370/331 |
| 2010/0017846 | A1* | 1/2010 | Huang et al. | 726/1 |
| 2010/0070978 | A1* | 3/2010 | Chawla et al. | 718/105 |
| 2010/0154029 | A1* | 6/2010 | Fernandez Alonso et al. | 726/1 |
| 2010/0250785 | A1* | 9/2010 | Shin et al. | 710/3 |
| 2010/0284278 | A1* | 11/2010 | Alanara | 370/235 |
| 2011/0004735 | A1* | 1/2011 | Arroyo et al. | 711/162 |
| 2011/0040812 | A1* | 2/2011 | Phillips | 707/822 |
| 2011/0040981 | A1* | 2/2011 | Lindahl et al. | 713/189 |
| 2011/0055299 | A1* | 3/2011 | Phillips | 707/827 |
| 2011/0061045 | A1* | 3/2011 | Phillips | 717/173 |
| 2011/0061046 | A1* | 3/2011 | Phillips | 717/176 |
| 2011/0126207 | A1* | 5/2011 | Wipfel et al. | 718/104 |
| 2011/0145555 | A1* | 6/2011 | Nayar et al. | 713/1 |
| 2011/0184993 | A1* | 7/2011 | Chawla et al. | 707/802 |
| 2011/0185292 | A1* | 7/2011 | Chawla et al. | 715/760 |
| 2011/0251992 | A1* | 10/2011 | Bethlehem et al. | 707/610 |
| 2011/0276963 | A1* | 11/2011 | Wu et al. | 718/1 |
| 2011/0295901 | A9* | 12/2011 | Tormasov | 707/793 |
| 2011/0314155 | A1* | 12/2011 | Narayanaswamy et al. | 709/226 |

FOREIGN PATENT DOCUMENTS

| | | |
|---|---|---|
| CN | 1333979 A | 1/2002 |
| CN | 1539225 A | 10/2004 |
| CN | 101110766 A | 1/2008 |
| CN | 101262420 A | 9/2008 |

OTHER PUBLICATIONS

"Adding Support for Explicit Congestion Notification," 3GPP TSG-SA WG2 Meeting #74, S2-094863, Ericsson, ST-Ericsson, AT&T, Alcatel-Lucent, Huawei, Nokia Siemens Networks, Jul. 6-10, 2009. 7 pages, Sophia-Antipolis, France, Europe.

International Search Report and Written Opinion received in International ApplicationNo. PCT/CN2010/074003 mailed Sep. 23, 2010, 13 pages.

Second Chinese Office Action received in Chinese Application No. 201080025539.2 mailed Sep. 17, 2014, 6 pages.

* cited by examiner

Rate 1 < Rate 2 < Rate 3 < Rate 4

| Frame Type | Mode Indication | Mode Request | Frame content (AMR mode, comfort noise, or other) |
|---|---|---|---|
| 0 | 0 | 0 | AMR 4.75 kbit/s |
| 1 | 1 | 1 | AMR 5.15 kbit/s |
| 2 | 2 | 2 | AMR 5.90 kbit/s |
| 3 | 3 | 3 | AMR 6.70 kbit/s (PDC-EFR) |
| 4 | 4 | 4 | AMR 7.40 kbit/s (TDMA-EFR) |
| 5 | 5 | 5 | AMR 7.95 kbit/s |
| 6 | 6 | 6 | AMR 10.2 kbit/s |
| 7 | 7 | 7 | AMR 12.2 kbit/s (GSM-EFR) |
| 8 | - | - | AMR SID |
| 9 | - | - | GSM-EFR SID |
| 10 | - | - | TDMA-EFR SID |
| 11 | - | - | PDC-EFR SID |
| 12-14 | - | - | For future use |
| 15 | - | - | No Data |

SYSTEM AND METHOD FOR ADAPTING AN APPLICATION SOURCE RATE TO A LOAD CONDITION

This application claims the benefit of U.S. Provisional Application No. 61/187,654, filed on Jun. 16, 2009, entitled "Method and Apparatus for Adapting an Application Source Rate to a Load Condition in a Wireless Communications Network," which application is hereby incorporated herein by reference.

TECHNICAL FIELD

The present invention relates generally to a system and method for wireless communications, and more particularly to a system and method for adapting an application source rate to a load condition.

BACKGROUND

Generally, in 4 G communications systems, such as Third Generation Partnership Project (3GPP) Long Term Evolution (LTE) compliant communications systems, voice communications may be supported in the form of voice over Internet protocol (VoIP), wherein voice data is transmitted as a data packet. For example, a user equipment (UE), which may also be commonly referred to as a mobile station (MS), may use an adaptive multi-rate (AMR) speech coder and decoder (CODEC) to generate a voice frame containing voice data. The UE may subsequently add a real-time protocol (RTP) header, a user data protocol (UDP) header, and an Internet protocol (IP) header to the voice frame to form an IP packet. The UE then transmits the IP packet over an air interface to an enhanced NodeB (eNB), which may also be referred to as a base station (BS).

The AMR CODEC is a single integrated speech CODEC with multiple source bit-rates ranging from a low of 4.75 kbps to a high of 12.2 kbps, and a low rate Silence Descriptor (SID) encoding mode for background noise. The AMR CODEC is capable of switching its bit-rate every 20-msec upon command.

In a 3GPP LTE compliant communications system, an eNB provides transportation for data and signalling between the UE and a core network. The eNB also provides necessary control signalling to the UE in order to maintain radio communications. The eNB may become overloaded when traffic load increases, such as during busy hours of operation. The eNB may become overloaded with respect to its radio links, transport network, and/or due to hardware and/or software limitations in network equipment.

In order to alleviate the overload, the eNB may wish to reduce the data rate for UE communications. For example, the eNB may only grant new UE communications at low data rates, even if the granted data rates are lower than data rates requested by the UE. Furthermore, the eNB may cause existing UE communications to reduce their data rates.

SUMMARY OF THE INVENTION

These and other problems are generally solved or circumvented, and technical advantages are generally achieved, by preferred embodiments of the present invention which provides a system and method for adapting an application source rate to a load condition.

In accordance with a preferred embodiment of the present invention, a method for forming a connection is provided. The method includes receiving a service authorization request for service between a first device and a second device, requesting a formation of a first bearer at the first data rate between the first device and the second device, determining if the first bearer was formed, transmitting a first positive response if the first bearer was formed, forming a second bearer at a second data rate between the first device and the second device if the first bearer was not formed, and completing the connection. The service authorization request includes a request to establish a connection at a first data rate, and the second data rate is different from the first data rate.

In accordance with another preferred embodiment of the present invention, a method for forming a connection including a communications device is provided. The method includes setting up a subscription for signalling path information, receiving signalling path information upon an occurrence of a trigger event, determining acceptable service information based on the signalling path information, and completing the connection based on the acceptable service information. The signalling path originates or terminates at the communications device.

In accordance with another preferred embodiment of the present invention, a method for communications device operations is provided. The method includes receiving congestion information related to a communications controller serving a communications device, processing the received congestion information, requesting a formation of a connection in response to determining that the communications device is to participate in the connection, and adjusting an active data rate of an active connection to an adjusted data rate in response to determining that the communications device is participating in the active connection. The connection has a data rate based on the accumulated congestion information, and the active data rate is adjusted based on the accumulated congestion information.

An advantage of an embodiment is that CODEC rate selection may be fine tuned in response to available resources at connection setup so that a selected rate will not exceed available resources nor will the selected rate be so far below an achievable rate due to an erroneously granted rate request that communications performance may fall below expectations. Furthermore, fine control of CODEC quality versus load conditions may be possible.

A further advantage of an embodiment is that a more rapid connection setup may be possible if a requested CODEC rate is not available and CODEC rate reduction is required, thereby improving user experience.

Yet another advantage of an embodiment is that fine tuning of CODEC rate during connection operation is allowed, so if load conditions change while a connection is active, the CODEC rate may be changed (either increased or decreased) to meet the changing load conditions.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE compliant communications system. The invention may also be applied, however, to other communications systems, such as those that are 3GPP LTE-Advance, WiMAX, and so forth, compliant.

Figure 1:
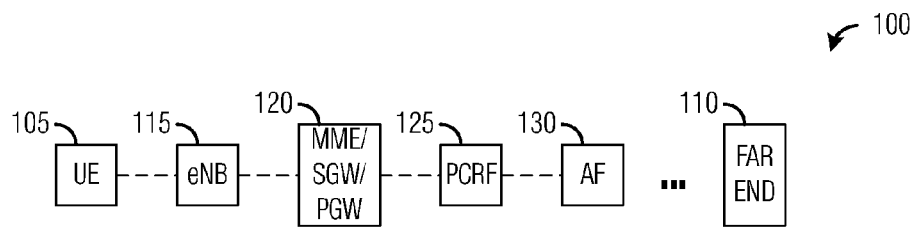
FIG. 1 is a diagram of network components in a communications system.

FIG. 1 illustrates network components in a communications system 100. Network components that may be involved in a connection between a UE 105 and a far end device 110 are shown. The connection may have originated at UE 105 and terminated at far end device 110 or originated at far end device 110 and terminated at UE 105.

Other network components involved in the connection include an eNB 115, a mobility management entity (MME)/serving gateway (SGW)/packet data network gateway (PGW) 120, a policy control and charging rules function (PCRF) 125, and an application function (AF) 130.

As discussed previously, eNB 115 may be used to provide transportation of data and signalling to UE 105. In general, eNB 115 may be responsible for controlling incoming and outgoing transmissions to and from UE 105. MME/SGW/PGW 120 may be separate entities but may also be implemented as a single unit depending on communications system architecture. MME may be used to initiate paging and authenticating of UE 105, as well as maintaining location information of UE 105. SGW may be used to route and forward user data (usually in the form of packets) for UE 105. SGW may also be used as a mobility anchor during handovers. PGW may be used to provide UE 105 connectivity to external packet data networks. PGW may serve as a point of entry and exit of traffic to and from UE 105. PCRF 125 may be used to detect service flow, enforce charging function, and so forth, in communications system 100. AF 130 may be used to provide dynamic policy or charging control.

eNB 115, MME/SGW/PGW 120, PCRF 125, and AF 130 shown in FIG. 1 may be associated with UE 105. To maintain simplicity, network components serving similar function to those shown in FIG. 1 but associated with far end device 110 but are not shown.

Figure 2:
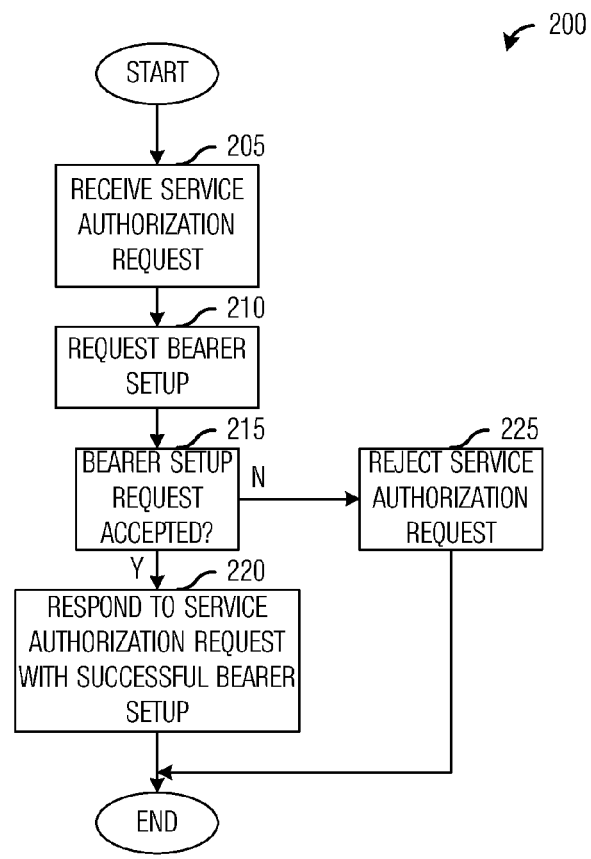
FIG. 2 is a flow diagram of operations in a prior art technique for responding to a connection request requesting service at a specific CODEC rate.

FIG. 2 illustrates a flow diagram of operations 200 in a prior art technique for responding to a connection request requesting service at a specific CODEC rate. Operations 200 may occur in a PCRF, for example.

Operations 200 may begin with the PCRF receiving a service authorization request (block 205). The service authorization request may include a specific CODEC rate. The PCRF may then request a bearer setup with the specific CODEC rate for the bearer (block 210).

After requesting the bearer setup, the PCRF may perform a check to determine if a response to the bearer setup request has been received and if it has, was the bearer setup request was accepted or rejected (block 215). If the bearer setup request was accepted, then the PCRF may respond to the service authorization request with an indication that the service authorization request succeeded and continue with additional operations to complete a setup of the service (block 220). Operations 200 may then terminate.

However, if the bearer setup request was rejected (block 215), then the PCRF may respond to the service authorization request with an indication that the service authorization request failed (block 225). In its response to the service authorization request, the PCRF simply indicates that the service authorization request failed with no additional information that may provide a reason why the service authorization request failed or hint at an acceptable CODEC rate what would have resulted in a successful service authorization request. It is then up to the device that requested the service authorization, e.g., a UE, to respond to the failed service authentication request. Operations 200 may then terminate.

As discussed above, the prior art technique illustrated in FIG. 2 does not provide any information that may assist a requester of service in establishing a connection. Therefore, if the requester's service authorization request is rejected, the requester is blind to what CODEC rate would result in an accepted connection (if any). The requester may then be forced to submit additional service authorization requests, which may take additional time as well as additional communications system resources that may be scarce when the communications system is in an overloaded state.

Figure 3:
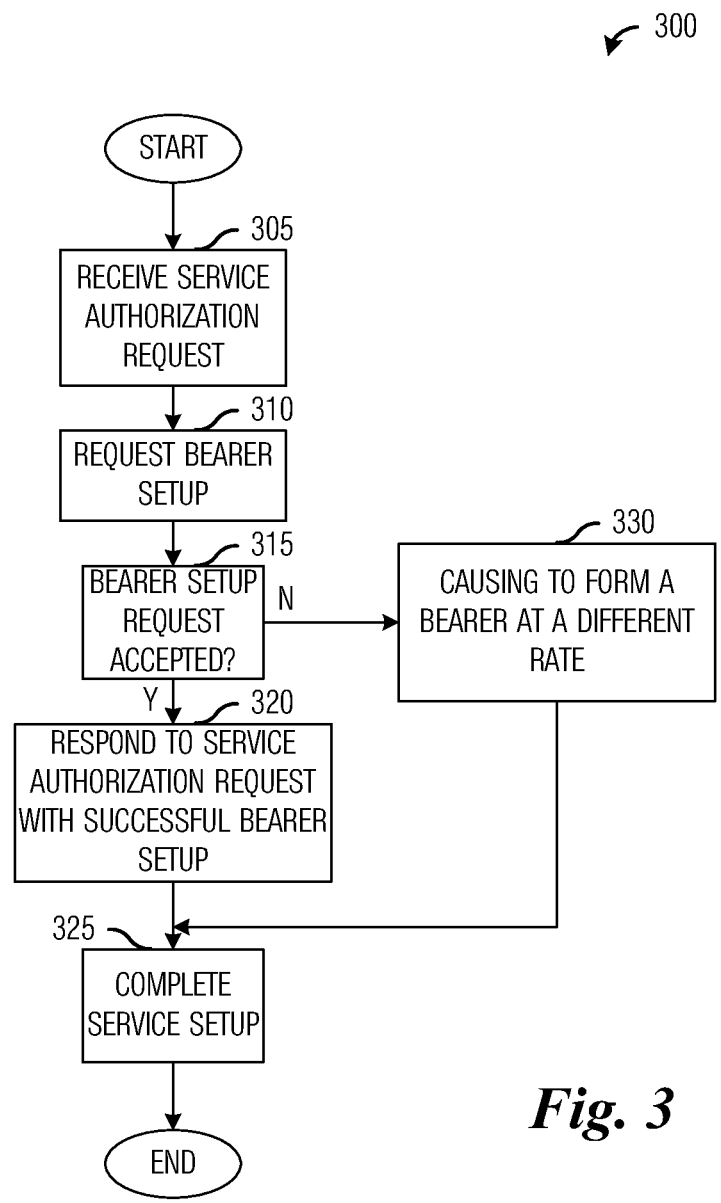
FIG. 3 is a flow diagram of operations in establishing and responding to a connection request requesting service at a specific CODEC rate.

FIG. 3 illustrates a flow diagram of operations 300 in establishing and responding to a connection request requesting service at a specific CODEC rate. The flow diagram shown in FIG. 3 may illustrate a high level view of an IP multimedia subsystem (IMS)-based technique for establishing and responding to a connection request requesting service at a specific CODEC rate.

The flow diagram illustrates operations based on IMS signalling and may include enhancements to protocols between an access network, a core network, and IMS entities during connection setup. The IMS-based techniques provides solutions for CODEC rate selection and modification by network components during connection setup that may or may not be based on resource availability.

According to current LTE signalling, a bearer setup attempt may only be accepted or rejected if insufficient resources are available to support the desired bearer configuration (e.g., QCI, GBR, etc.). Furthermore, a cause for the rejection may be indicated in current LTE signalling. However, there is no information to be included that may indicate what bearer configuration would be acceptable for acceptance, such as a lower CODEC rate.

Operations 300 may be indicative of operations occurring in a PCRF as the PCRF receives a service authorization request from a UE requesting a connection with a specified CODEC rate. Operations 300 may occur while the PCRF is in a normal operating mode.

Operations 300 may begin with the PCRF receiving a service authorization request (block 305). The service authorization request may be from an AF in response to a connection request from a UE. The service authorization request may include a specific CODEC rate or multiple specific CODEC rates. As an example, the service authorization request may contain several acceptable CODEC rates with a highest CODEC rate being a most preferred.

The PCRF may then request a bearer setup with the specific CODEC rate for the bearer (block 310). According to an embodiment, the request for a bearer setup may be sent to an MME/SGW/PGW anchoring a terminating UE, which may be forwarded to an eNB serving the terminating UE. The eNB may determine if it wishes to support communications at the specific CODEC rate.

The PCRF may perform a check to determine if a response to the bearer setup request has been received and if it has, was the bearer setup request was accepted or rejected (block 315). If the bearer setup request was accepted, then the PCRF may respond to the service authorization request with an indication that the service authorization request succeeded (block 320) and continue with additional operations to complete a setup of the service (block 325). Operations 300 may then terminate.

However, if the bearer setup request was rejected (block 315), then the PCRF may respond to the service authorization request by causing to form a bearer at a rate different from the specific CODEC rate (block 330). After forming the bearer at a different rate, the PCRF may continue to complete the service setup (block 325). In causing to form the bearer at a different rate, the PCRF may take several actions that are responsive to the rejection of the service authorization request and may help improve the performance of the communications system.

In general, the PCRF (or another network entity, such as an AF) may provide additional information such as acceptable CODEC rates and/or configuration that may be accepted given communications system load. Alternatively, given acceptable bearer configuration and/or acceptable CODEC rates, the PCRF (or the AF) may be able to take steps to modify the service authorization request accordingly.

According to an embodiment, the PCRF (or the AF) may provide in its response to the service authorization request, information related to acceptable CODEC rates. As an example, if the service authorization request specified a CODEC rate of A and was subsequently rejected, the PCRF may include acceptable CODEC rates of B, C, and D in its response to the service authorization request, where CODEC rates B, C, and D are different from CODEC rate A, and generally are lower rates than CODEC rate A. The initiator of the service authorization request may then initiate another service authorization request.

According to another embodiment, the PCRF (or the AF) may intervene with the service authorization request and actively participate in the connection setup. The PCRF (or the AF) may, upon determining that the bearer setup request was rejected, submit subsequent bearer setup requests at different (typically lower) CODEC rates. Once the eNB accepts a bearer setup request at a different CODEC rate, the PCRF (or the AF) may respond to the service authorization request with an indication that the service authorization request was accepted but at a CODEC rate that is different from the specific CODEC rate.

Detailed discussions of the embodiments are provided below.

Figure 4:
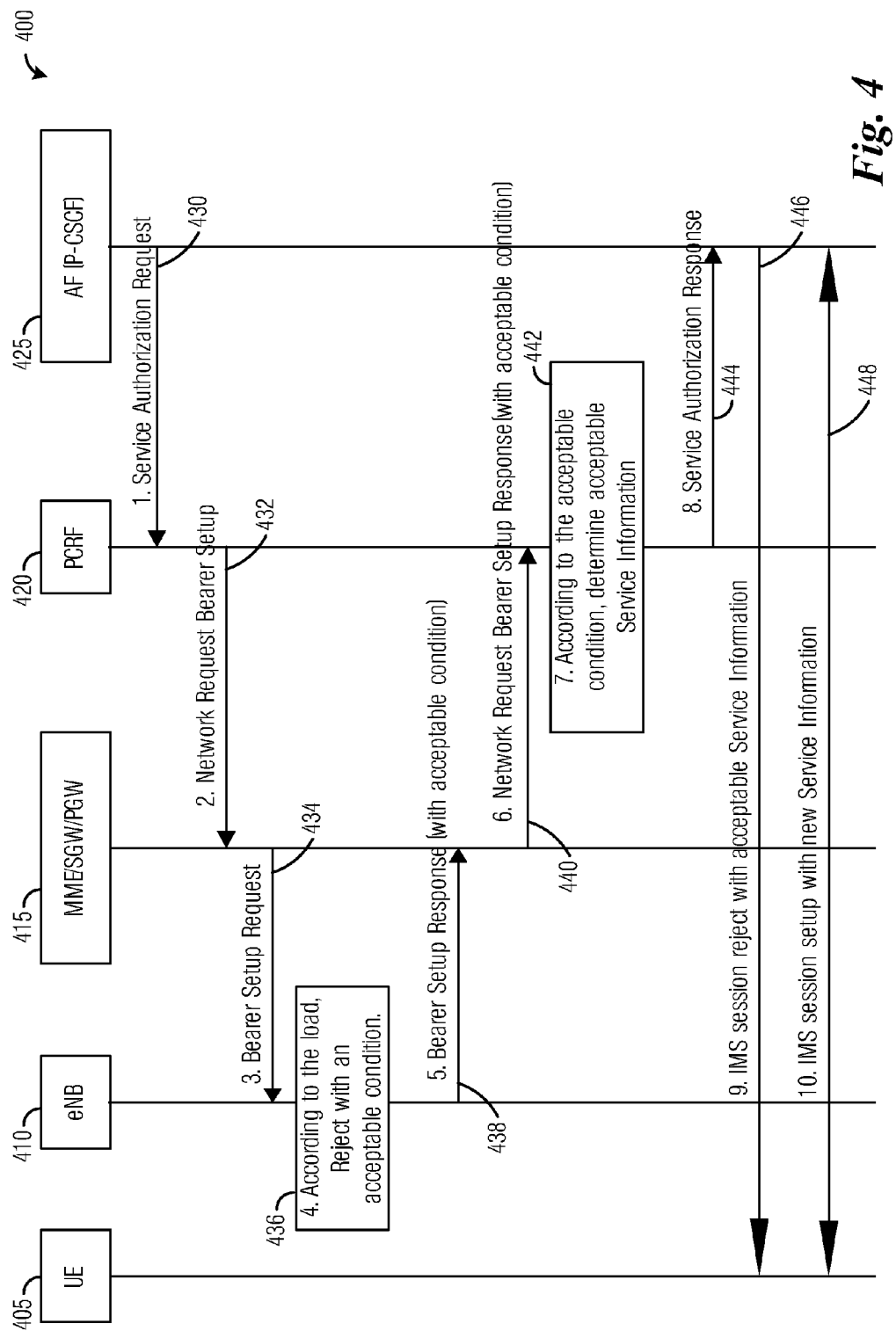
FIG. 4 is a diagram of a call flow in a connection setup, wherein additional CODEC information is provided to a requester of the connection in response to a rejection of a service authorization request, and wherein a UE is an initiator of the connection being setup.

FIG. 4 illustrates a call flow in a connection setup, wherein additional CODEC information is provided to a requester of the connection in response to a rejection of a service authorization request, and wherein a UE is an initiator of the connection being setup. As shown in FIG. 4, the message exchange in the connection setup involves messages between a UE 405, an eNB 410, a MME/SGW/PGW 415, a PCRF 420, and an AF 425.

The call flow may begin with AF 425 sending a service authorization request to PCRF 420 (block 430). Since UE 405 is the initiator of the connection being setup, the service authorization request may have originated from UE 405 with a terminator of the connection being setup being a far end device, such as another UE, a data source, or some other far end communications device. The service authorization request may specify a CODEC rate desired for the connection. PCRF 420 may then send a network bearer setup request to MME/SGW/PGW 415, which may serve to anchor UE 405 (block 432). The network bearer setup request may include information regarding the bearer that PCRF 420 wishes to establish, including a desired CODEC rate.

MME/SGW/PGW 415, in response to the network bearer setup request, may send a bearer setup request that includes the desired CODEC rate to eNB 410, which is serving UE 405 (block 434). For discussion purposes, let eNB 410, according to its load, reject the bearer setup request (block 436). According to an embodiment, rather than simply rejecting the bearer setup request, eNB 410 may provide information regarding the rejected bearer setup request. As an example, eNB 410 may specify one or more CODEC rates that it may find acceptable. Usually, the one or more CODEC rates may be lower than the desired CODEC rate.

eNB 410 may send a bearer setup response along with the information regarding the rejected bearer setup request (e.g., the one or more acceptable CODEC rates) to MME/SGW/PGW 415 (block 438). MME/SGW/PGW 415 may send a network bearer request response with the information regarding the rejected bearer setup request to PCRF 420 (block 440).

PCRF 420 may then determine acceptable service information based on the one or more acceptable CODEC rates (block 442) and send a service authorization response to AF 425 containing the acceptable service information (block 444). PCRF 420 select a CODEC rate from the one or more acceptable CODEC rates based on historical information, its own knowledge of communications system conditions, the specified CODEC rate from UE 405, expected use of the connection, and so forth, to be included in the acceptable service information.

AF 425 may send an IMS session rejection along with the acceptable service information to UE 405, originator of the service authorization request (block 446). Based on the acceptable service information, UE 405 may initiate another service authorization request with a different specified CODEC rate (block 448). Alternatively, if the CODEC rate specified in the acceptable service information is not acceptable to UE 405, then UE 405 may elect to abandon trying to setup the connection and perhaps attempt to create the connection at a later time.

Figure 5A:
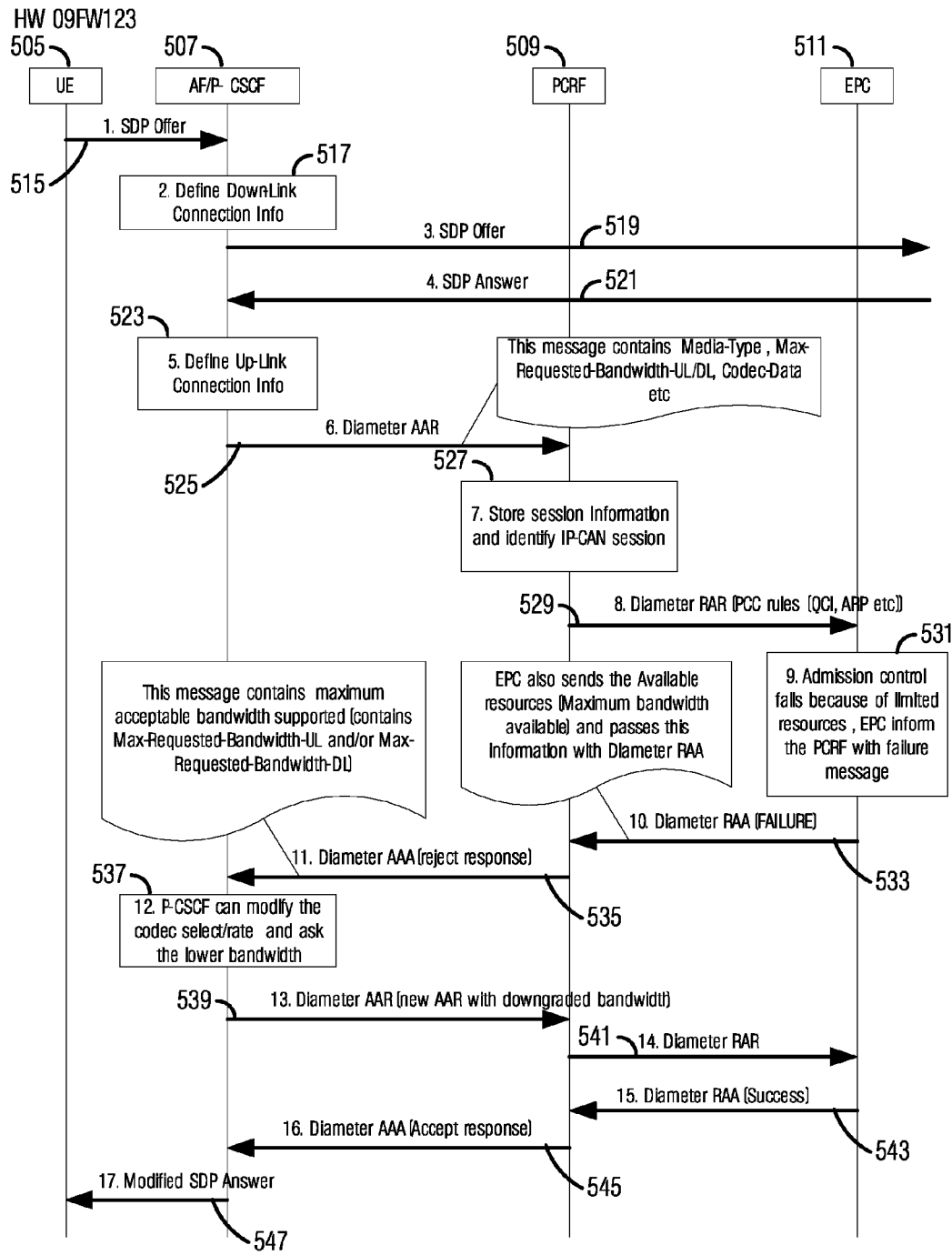
FIG. 5a is a diagram of a call flow of a connection setup, wherein a PCRF intervenes in the connection setup in response to a rejection of a service authorization request, and wherein a UE is an initiator of the connection being setup.

FIG. 5*a* illustrates a call flow of a connection setup, wherein a PCRF intervenes in the connection setup in response to a rejection of a service authorization request, and wherein a UE is an initiator of the connection being setup. As shown in FIG. 5*a*, the message exchange in the connection setup involves messages between a UE 505, an AF 507, a PCRF 509, and an evolved packet core (EPC) 511.

The call flow may begin with UE 505 initiating a connection with a service delivery platform (SDP) offer sent to AF 507 (block 515). AF 507 may define downlink connection information which may include CODEC rate (block 517) and forward the SDP offer to far end network components (block 519). The far end network components may respond to the SDP offer with a SDP answer (block 521).

Based on information contained in the SDP answer, AF 507 may be able to define uplink connection information which may also include CODEC rate (block 523). AF 507 may then be ready to setup a bearer based to support the connection request from UE 505. AF 507 may send a Diameter AA-request (AAR) to PCRF 509 (block 525). According to an embodiment, the Diameter AAR may include information such as media-type, maximum requested bandwidth (both uplink and downlink), codec data, and so forth.

PCRF 509 may store session information and identify an IP-CAN session (block 527) and send a Diameter re-auth-request (RAR) to EPC 511 (block 529). The Diameter RAR may include information such as PCC rules, including Quality of Service Class Identifier (QCI), Allocation/Retention Priority (ARP), and so forth). EPC 511 may then decide to grant the Diameter RAR based on considerations such as available resources, for example.

For discussion purposes, assume that EPC 511 fails the Diameter RAR. EPC 511 informs PCRF 509 of the failure of the Diameter RAR by using a Diameter re-auth-answer (RAA) (block 533). PCRF 509 informs AF 507 of the failure of the Diameter AAR with a Diameter AA-answer (AAA) indicating a rejection (block 535). AF 507 (or a proxy CSCF) may modify the CODEC rate to a lower bandwidth, for example (block 537) and AF 507 may send a new Diameter AAR with the new CODEC rate to PCRF 509 (block 539).

PCRF 509 may then send a new Diameter RAR with the new CODEC rate to EPC 511 (block 541). For discussion purposes, let EPC 511 grant a new Diameter RAR with the new CODEC rate. EPC 511 sends a new Diameter RAA with an indication of success of the Diameter RAR to PCRF 509 (block 543) and PCRF 509 sends a new Diameter AAA with an indication of success of the Diameter AAR with an indication of acceptance to AF 507 (block 545). AF 507 sends a SDP answer to UE 505 with an indicator of a modified CODEC rate (block 547).

Figure 5B:
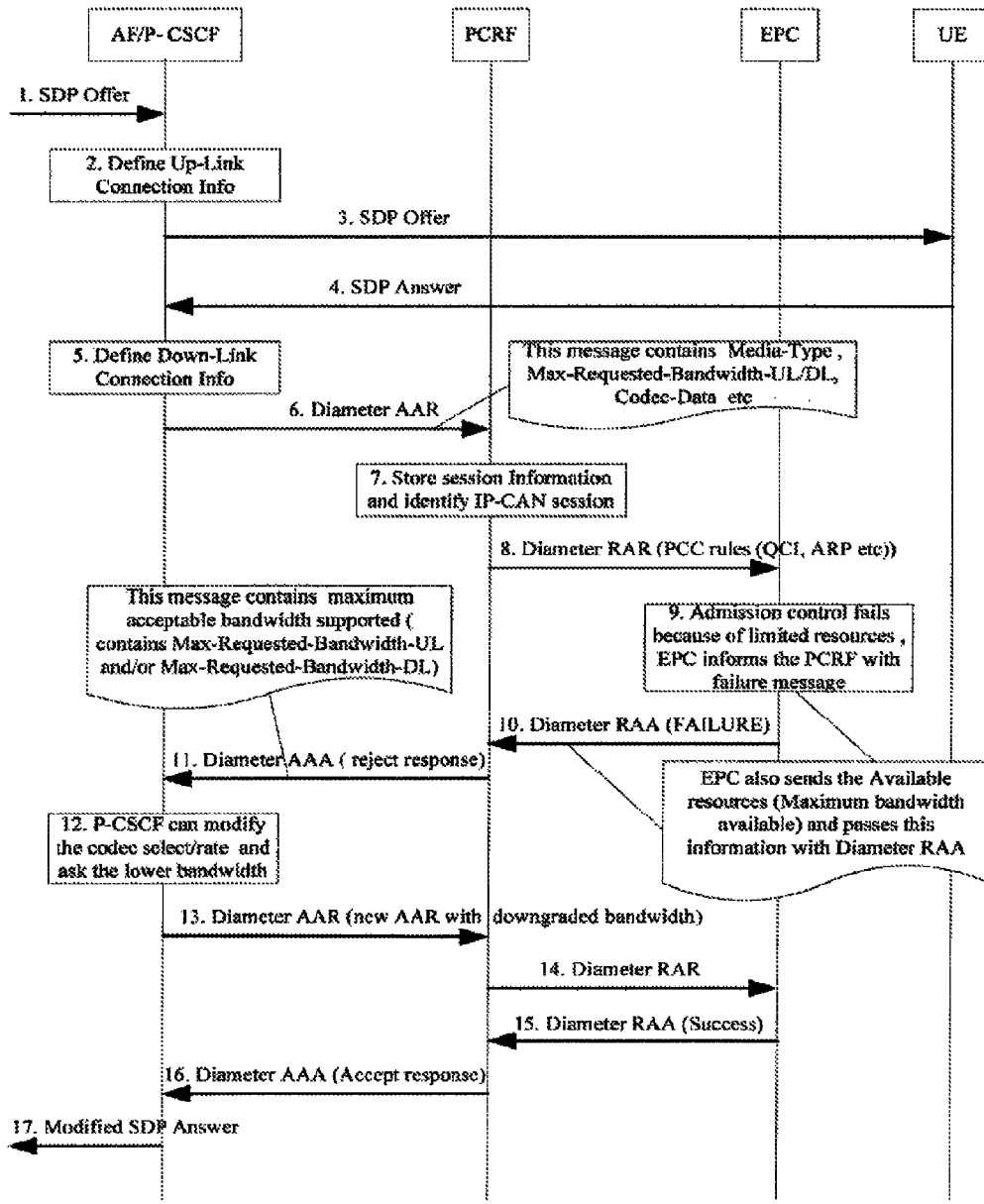
FIG. 5b is a diagram of a call flow of a connection setup, wherein a PCRF intervenes in the connection setup in response to a rejection of a service authorization request, and wherein a UE is a terminator of the connection being setup.

FIG. 5*b* illustrates a call flow of a connection setup, wherein a PCRF intervenes in the connection setup in response to a rejection of a service authorization request, and wherein a UE is a terminator of the connection being setup. The call flow of the connection setup as shown in FIG. 5*b* is substantially similar to the call flow shown in FIG. 5*a* with exception of an ordering of the definition of the uplink and downlink connection information (the uplink and the downlink connection information definition are reversed) and the SDP offer and SDP answer originate and terminate with far end network components rather than the UE.

As shown in FIGS. 5*a* and 5*b*, no IMS session re-attempts are made by UE 505 (or the far end network component originating the connection request). Furthermore, PCRF 509 may accept or reject the SDP information provided by UE 605 (or the far end network component originating the connection request) but may not modify information contained within the SDP offer.

Figure 6A:
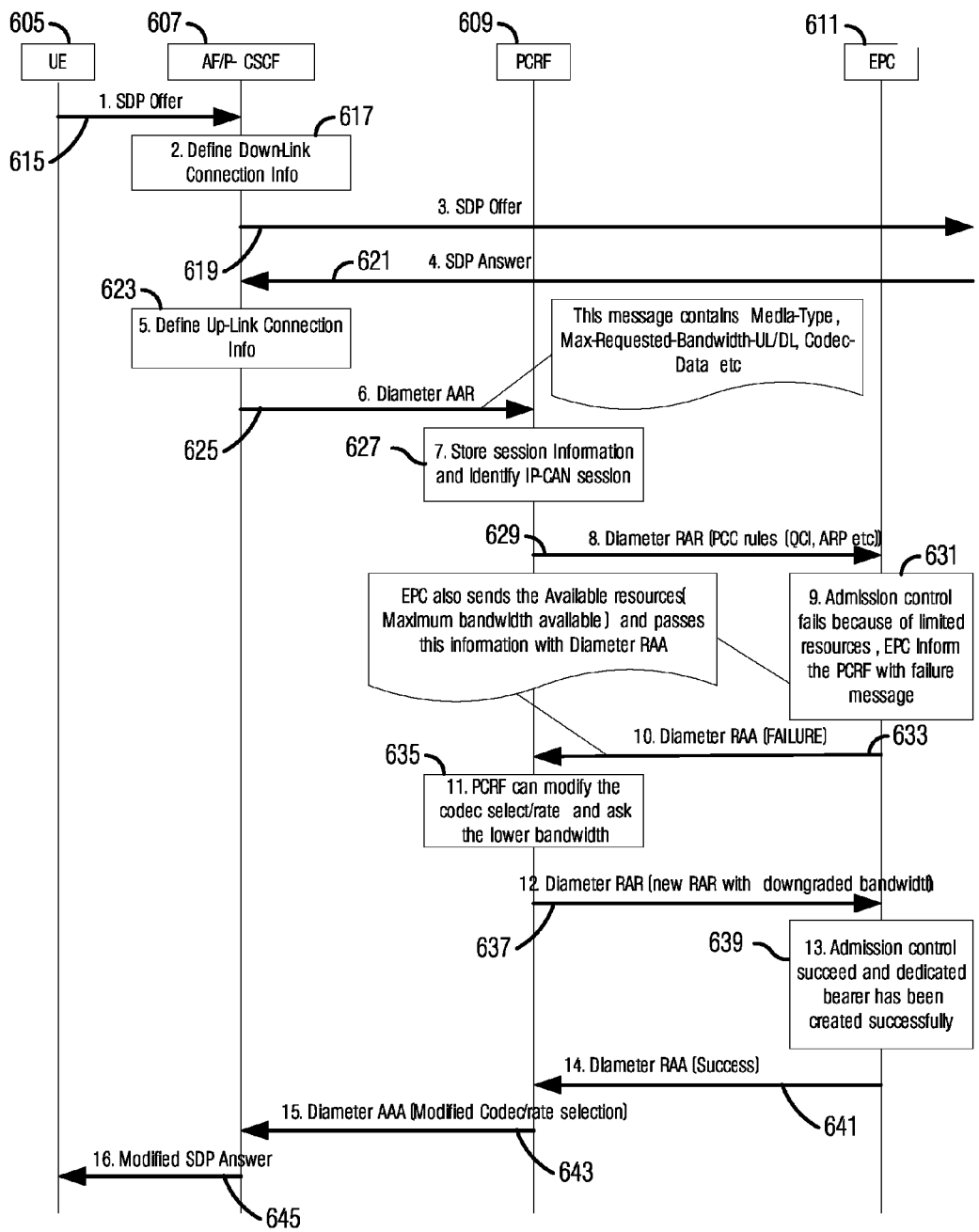
FIG. 6a is a diagram of a call flow of a connection setup, wherein an AF intervenes in the connection setup in response to a rejection of a service authorization request, and wherein a UE is an initiator of the connection being setup.

FIG. 6*a* illustrates a call flow of a connection setup, wherein an AF intervenes in the connection setup in response to a rejection of a service authorization request, and wherein a UE is an initiator of the connection being setup. As shown in FIG. 6*a*, the message exchange in the connection setup involves messages between a UE 605, an AF 607, a PCRF 609, and an evolved packet core (EPC) 611.

The call flow may begin with UE 605 initiating a connection with a SDP offer sent to AF 607 (block 615). AF 607 may define downlink connection information which may include CODEC rate (block 617) and forward the SDP offer to far end network components (block 619). The far end network components may respond to the SDP offer with a SDP answer (block 621).

Based on information contained in the SDP answer, AF 607 may be able to define uplink connection information which may also include CODEC rate (block 623). AF 607 may then be ready to setup a bearer based to support the connection request from UE 605. AF 607 may send a Diameter AA-request (AAR) to PCRF 609 (block 625). According to an embodiment, the Diameter AAR may include information such as media-type, maximum requested bandwidth (both uplink and downlink), codec data, and so forth.

PCRF 609 may store session information and identify an IP-CAN session (block 627) and send a Diameter re-auth-request (RAR) to EPC 611 (block 629). The Diameter RAR may include information such as PCC rules, including QCI, ARP, and so forth). EPC 611 may then decide to grant the Diameter RAR based on considerations such as available resources, for example.

For discussion purposes, assume that EPC 611 fails the Diameter RAR. EPC 611 informs PCRF 609 of the failure of the Diameter RAR by using a Diameter re-auth-answer (RAA) (block 633). According to an embodiment, included in the Diameter RAA may be information related to available resources, e.g., a maximum available bandwidth.

PCRF 609 may modify the specified CODEC rate or select a new CODEC rate based on the information related to the available resources provided in the Diameter RAA from EPC 611 (block 635) and send a new Diameter RAR with the modified or new CODEC rate to EPC 611, thereby requesting a new bearer with the modified specified CODEC rate or new CODEC rate (block 637).

Let EPC 611 grant the new bearer request and create the bearer (block 639) and sends a new Diameter RAA to PCRF 609 with an indication of success (block 641). PCRF 609 may send a new Diameter AAA with an indication of acceptance of Diameter AAR with the modified or new CODEC rate to AF 607 (block 643). AF 607 may send a SDP answer to UE 605 indicating that the connection request by UE 605 has been granted but at the modified or new CODEC rate (block 645).

Figure 6B:
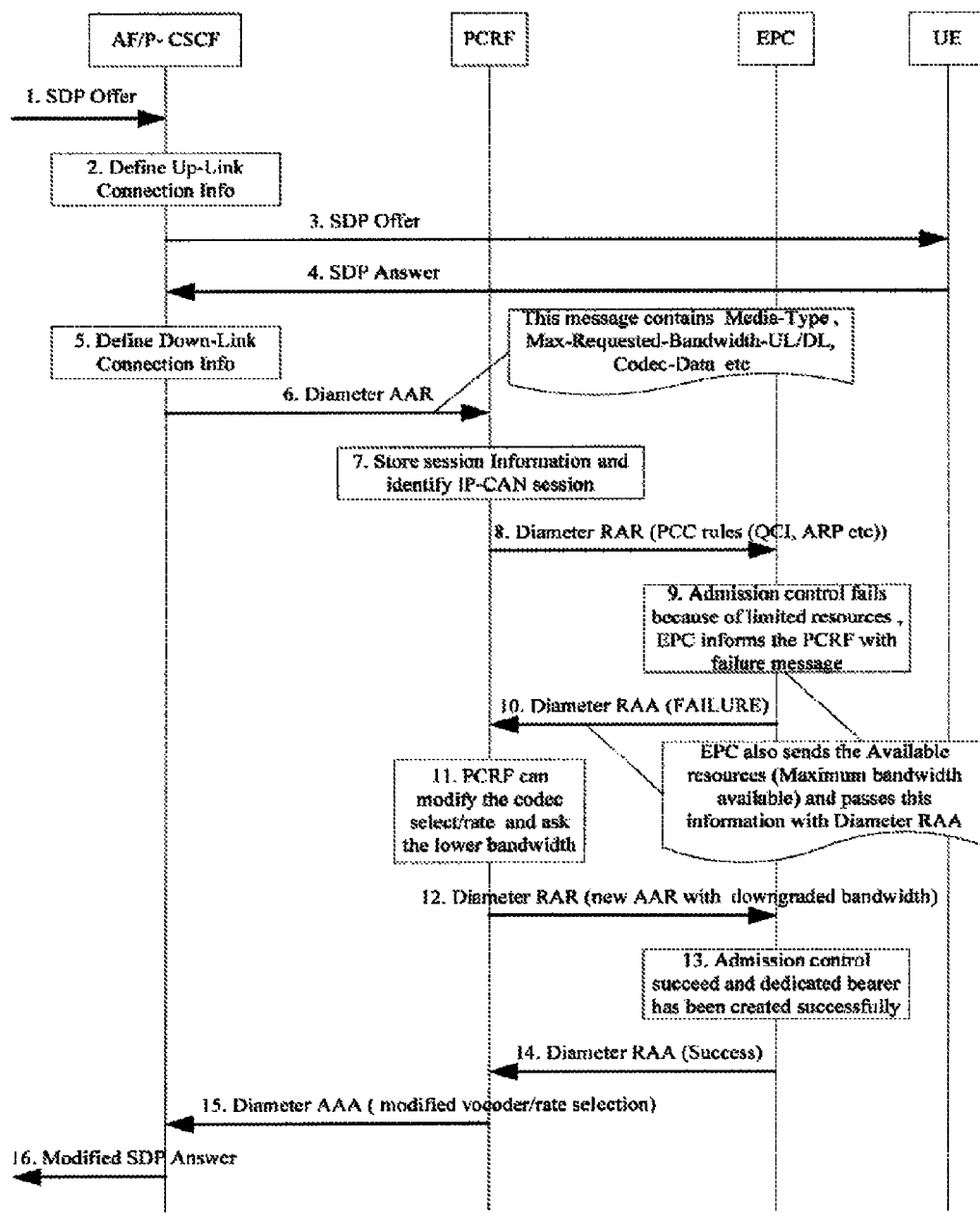
FIG. 6b is a diagram of a call flow of a connection setup, wherein an AF intervenes in the connection setup in response to a rejection of a service authorization request, and wherein a UE is a terminator of the connection being setup.

FIG. 6b illustrates a call flow of a connection setup, wherein an AF intervenes in the connection setup in response to a rejection of a service authorization request, and wherein a UE is a terminator of the connection being setup. The call flow of the connection setup as shown in FIG. 6b is substantially similar to the call flow shown in FIG. 6a with exception of an ordering of the definition of the uplink and downlink connection information (the uplink and the downlink connection information definition are reversed) and the SDP offer and SDP answer originate and terminate with far end network components rather than the UE.

As shown in FIGS. 6a and 6b, no IMS session re-attempts are made by UE 605 (or the far end network component originating the connection request). Furthermore, PCRF 609 may modify the SDP information provided by UE 605 (or the far end network component originating the connection request).

Communications system load information, along with acceptable bearer configuration may be communicated to the PCRF (or PGW) in several different ways. According to an embodiment, a reactive approach may be used to communicate communications system load information and acceptable bearer information to the PCRF (or PGW). In the reactive approach, the acceptable bearer information (and communications system load information) may be provided by the eNB only in response to a connection setup request and when the connection setup request cannot be fulfilled, i.e., the connection setup request is rejected by the eNB. An advantage of the reactive approach is that signalling load may be minimized at the expense of increased bearer setup delay.

Figure 7:
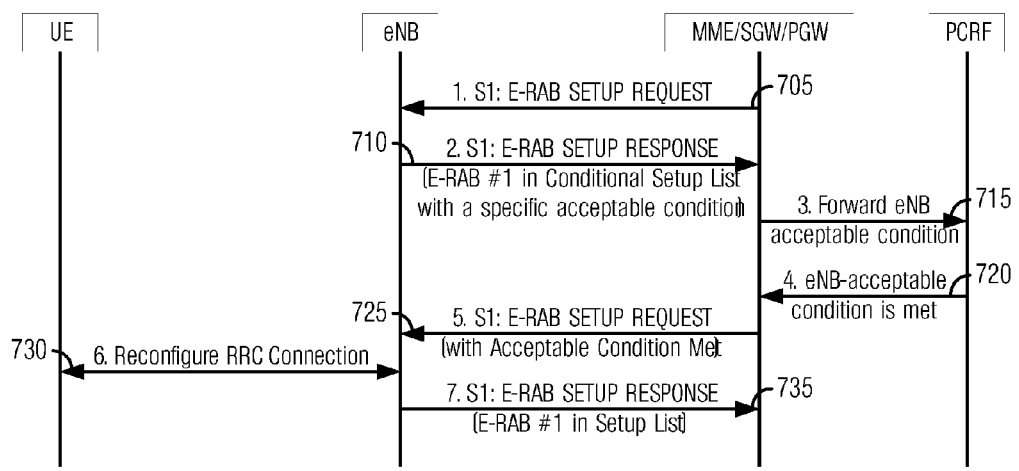
FIG. 7 is a diagram of a call flow in reactively providing acceptable bearer information.

FIG. 7 illustrates a call flow in reactively providing acceptable bearer information. As shown in FIG. 7, a MME/SGW/PGW sends a connection setup request, for example, an E-RAB setup request, to an eNB controlling a UE initiating a connection request (block 705). The eNB may send back to the MME/SGW/PGW a response, for example, an E-RAB setup response, with one or more acceptable bearer configurations (block 710).

The MME/SGW/PGW may send to a PCRF the one or more acceptable bearer configurations (block 715) and the PCRF may determine that at least one of the one or more acceptable bearer configurations are met (block 720).

The MME/SGW/PGW may then send a connection setup request, for example, another R-RAB setup request, to the eNB, wherein the connection setup request contains an indication that the one or more acceptable bearer configurations are met (block 725). The UE and the eNB may coordinate to reconfigure the connection (block 730) and the eNB may send a connection setup response to the MME/SGW/PGW with an indication that the bearer has been setup (block 735).

According to an embodiment, a proactive approach may be used to communicate communications system load information and acceptable bearer information to the PCRF (or PGW). In the proactive approach, the eNB provides a congestion report to the PCRF (or PGW) once a default bearer is established. The congestion report may be updated and/or maintained either periodically or trigger by events, such as changing load conditions or connection status. An advantage of the proactive approach is that communications system load information may be immediately available to the PCRF (or PGW) at time of bearer creation, thereby minimizing delays in bearer setup since the communications system load information may be used to select an appropriate CODEC rate a first time a connection setup is attempted with no rejections, retries, and so forth.

Figure 8:
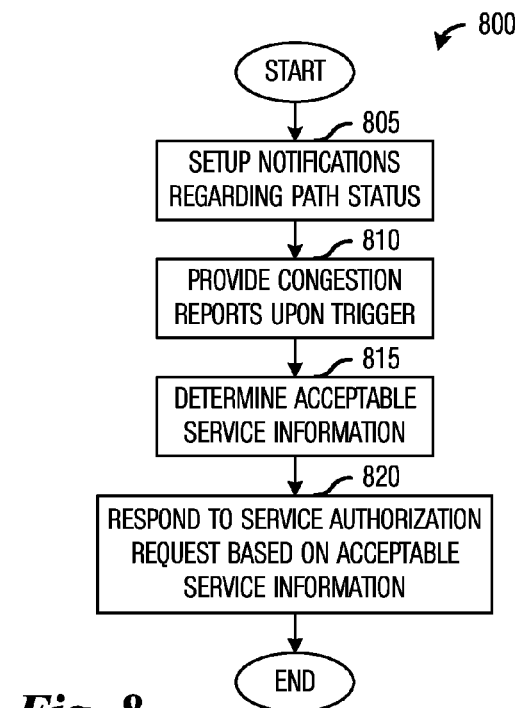
FIG. 8 is a flow diagram of operations in setting up a connection with proactively provided communications system load information and acceptable bearer information.

FIG. 8 illustrates a flow diagram of operations 800 in setting up a connection with proactively provided communications system load information and acceptable bearer information. Operations 800 may be indicative of operations occurring in network components, such as an AF or a PCRF, involved in setting up a connection to or from a UE. Operations 800 may occur while the communications system is in a normal operating mode.

Operations 800 may begin with an establishment of a subscription for the delivery of signalling path status, such as communications system load information, acceptable bearer information, congestion information, and so forth (block 805). According to an embodiment, an AF may subscribe to receive from a PCRF notifications regarding signaling path status. The subscription may utilize existing signalling capabilities of the communications system and may be triggered by session initiation protocol (SIP) registration with the IMS network. With the subscription setup, the AF may periodically receive from the PCRF signalling path status updates. Alternatively, the AF may receive the signalling path status updates from the PCRF whenever a signalling path status changes, such as when a connection from a UE changes from idle to busy and vice versa.

At predetermined times or occurrence of an event, the PCRF may send signalling path information to the AF (block 810). The AF may make use to the signalling path information to determine acceptable service information (block 815). As an example, the AF may determine an acceptable CODEC rate based on the signalling path information.

The AF may then respond to a service authorization request based on the acceptable service information (block 820). For example, if the service authorization request includes a specified CODEC rate that is higher than what is included in the acceptable service information, the AF may reject the service authorization request and suggest an acceptable CODEC rate or the AF may reject the service authorization request and intervene in the service authorization request process and initiate its own service request at acceptable CODEC rates. Operations 800 may then terminate.

Figure 9A:
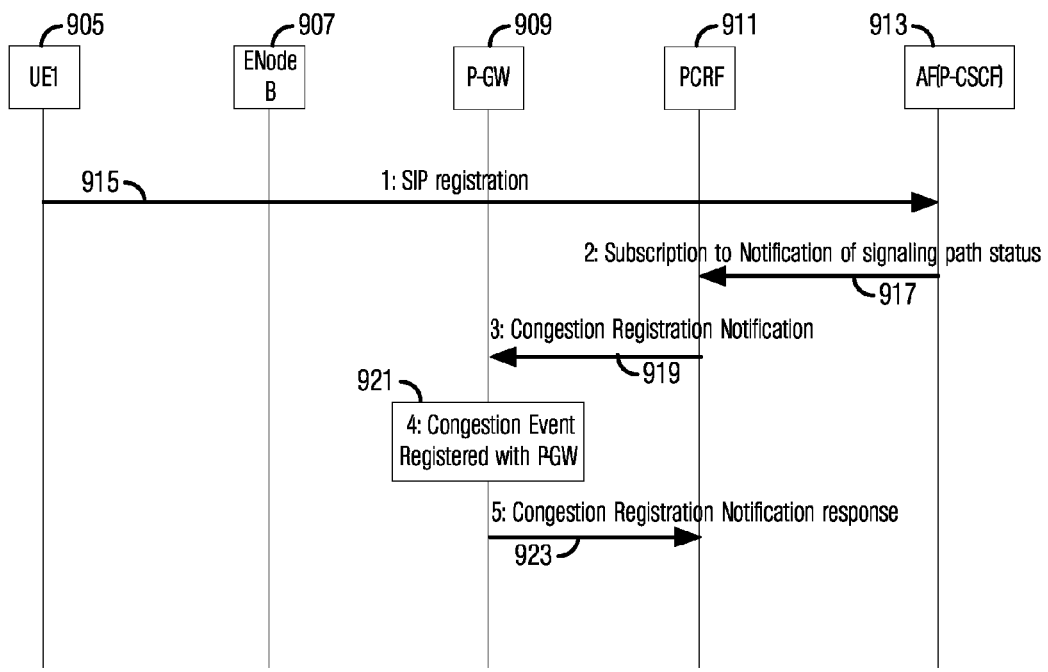
FIG. 9a is a diagram of a call exchange in the setup of a subscription for a delivery of signalling path information.

FIG. 9a illustrates a call exchange in the setup of a subscription for a delivery of signalling path information. As shown in FIG. 9a, the call exchange involves a UE 905, an eNB 907, a PGW 909, a PCRF 911, and an AF 913.

The call exchange may begin with UE 905 registering with a communications system through a SIP registration message with the AF 913 as UE 905 enters the communications system (block 915). AF 913 may wish to receive updates regarding signalling path information related to UE 905.

AF 913 receives signalling path information updates by establishing a subscription with PGW 909 which anchors UE 905. Establishing the subscription may be achieved by sending a subscription to notification of signalling path information to PCRF 911 (block 917), which in turn, sends a congestion registration notification message to PGW 909 (block 919).

PGW 909 saves in its memory a congestion event involving UE 905 and AF 913 so that whenever a signalling path status related to UE 905 changes, PGW 909 may send the signalling path status change to AF 913 (block 921). According to an embodiment, certain signalling path status changes will result in PGW 909 sending the signalling path information change to AF 913. For example, when the status of a connection involving UE 905 changes from idle to busy may be a trigger for PGW 909 to send signalling path information to AF 913. PGW 909 may then send a congestion registration notification response to PCRF 911 to indicate that the subscription has been successfully recorded (block 923).

Figure 9B:
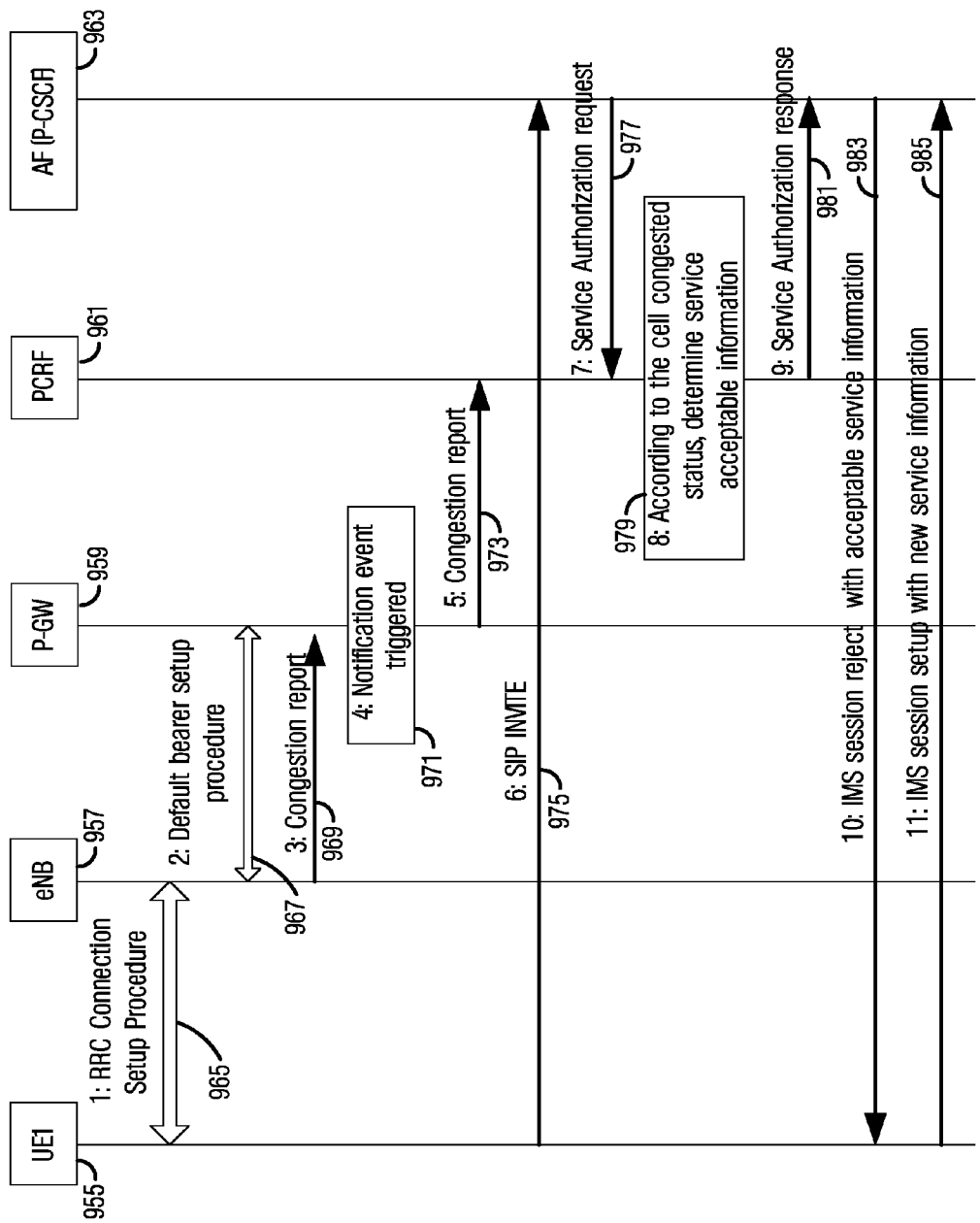
FIG. 9b is a diagram of a call exchange in a connection setup initiated by a UE, wherein communications system load information and acceptable bearer information, as well as other signalling path information, are proactively provided.

FIG. 9b illustrates a call exchange in a connection setup initiated by a UE, wherein communications system load information and acceptable bearer information, as well as other signalling path information, are proactively provided. As shown in FIG. 9b, the call exchange involves a UE 955, an eNB 957, a PGW 959, a PCRF 961, and an AF 963.

The call exchange may begin with UE 955 participating in a connection setup procedure with eNB 957 (block 965). In order to participate in the connection setup procedure, UE may first register with the communications system. Discussion of UE registration procedures may be beyond the scope of the embodiments and will not be discussed herein.

As a result of UE 955 registering with the communications system, AF 963 may wish to receive updates regarding signalling path information related to UE 955. AF 963 may receive updates by subscribing for the delivery of signalling path information updates. AF 963 may subscribe for the delivery of signalling path information updates by participating in a call exchange such as on shown in FIG. 9a.

After participating in the connection setup procedure with UE 955, eNB 957 may participate in a default bearer setup procedure with PGW 959 (block 967). In addition to participating in the default bearer setup procedure with PGW 959, eNB 957 may send signalling path information to PGW 959, wherein the signalling path information may reflect changes due to the setup of the default bearer.

The setup of the default bearer may be a triggering event for the delivery of signalling path information (block 971). As a result of the occurrence of the triggering event, PGW 959 may send signalling path information, including communications system congestion report to PCRF 961 (block 973). PCRF 961 may maintain an accumulation of signalling path information. Alternatively, PCRF 961 maintains only a most recent copy of the signalling path information.

UE 955 may initiate a setup of a connection with a far end network component through an SIP invite message to AF 963 (block 975). In response to which, AF 963 may send a service authorization request to PCRF 961 with a specific CODEC rate as specified in the SIP invite message from UE 955 (block 977). According to the signalling path information, e.g., communications system load information, stored at PCRF 961, PCRF 961 may determine acceptable service information, which may or may not be equal to the specific CODEC rate specified by UE 955 or AF 963 (block 979).

PCRF 961 may send a response to the service authorization request, wherein the response includes the acceptable service information (block 981). For discussion purposes, assume that the PCRF determines that the specific CODEC rate as specified in the SIP invite is not acceptable and reject the SIP invite, AF 963 may send a message with an indication of a rejection along with the acceptable service information to UE 955 (block 983). Based on the acceptable service information included in the message from AF 963, UE 955 may decide to setup another connection using the acceptable service information (block 985) or abandon the attempt to setup the connection all together or try again at a later time.

Figure 9C:
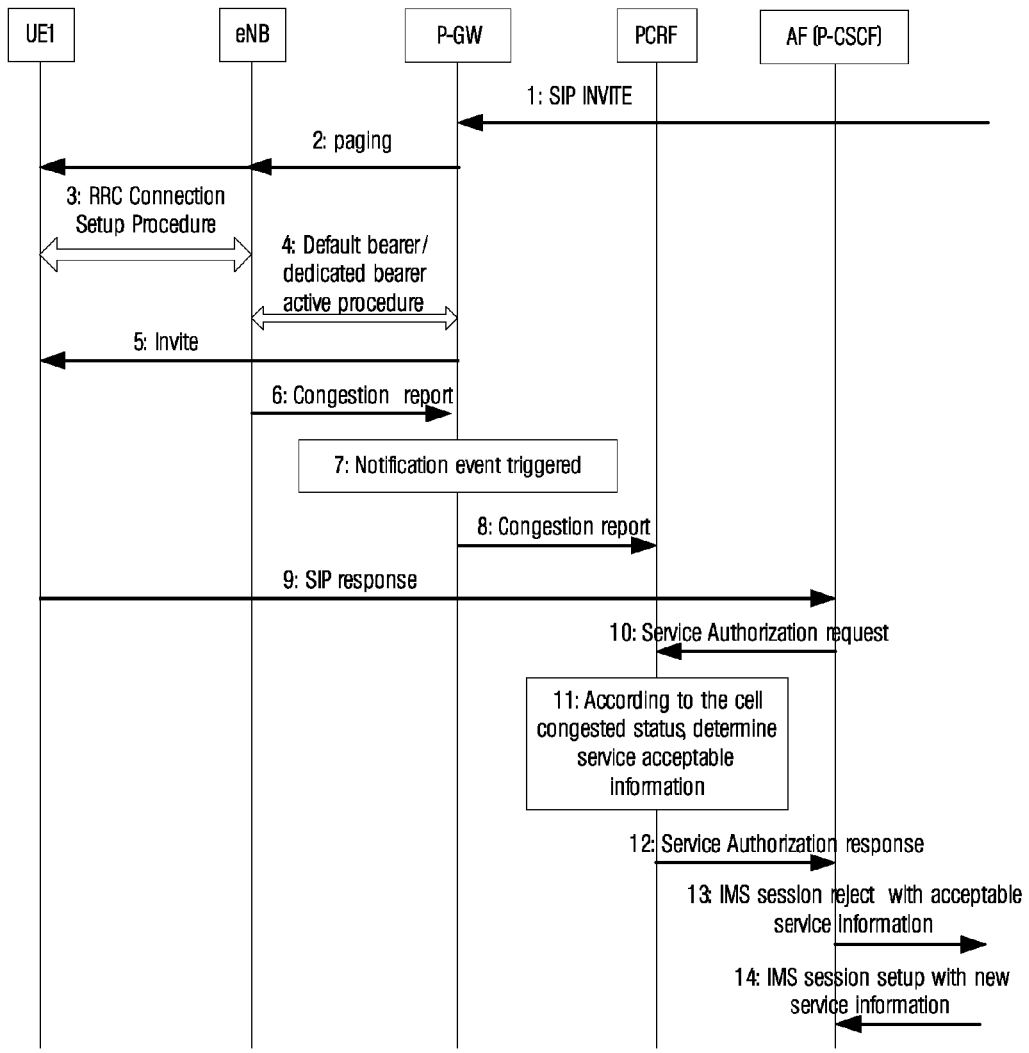
FIG. 9c is a diagram of a call exchange in a connection setup terminated by a UE, wherein communications system load information and acceptable bearer information, as well as other signalling path information, are proactively provided.

FIG. 9c illustrates a call exchange in a connection setup terminated by a UE, wherein communications system load information and acceptable bearer information, as well as other signalling path information, are proactively provided. The call exchange shown in FIG. 9c may be substantially similar to the call exchange shown in FIG. 9c in that a multi-step process is followed, including a setup of a subscription for signalling path status updates, detection of a triggering event to share the signalling path information, determining acceptable service information from the signalling path information, and accepting or rejecting a connection request based on the acceptable service information.

Figure 9D:
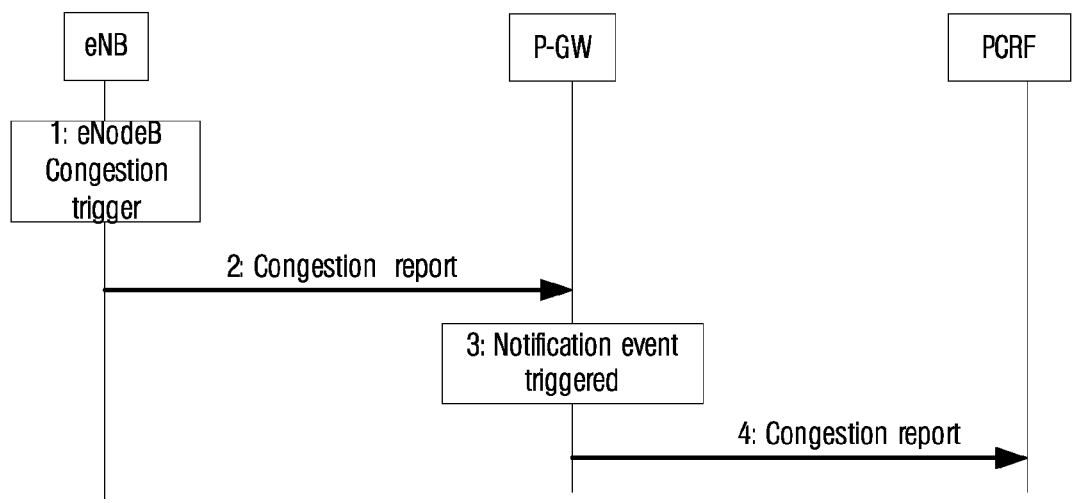
FIG. 9d is a diagram of a call exchange in an eNB providing communications system load information.

FIG. 9d illustrates a call exchange in an eNB providing communications system load information. The call exchange shown in FIG. 9d illustrates the providing of communications system load information by the eNB to a PGW and then the PGW providing the communications system load information in response to an occurrence of a triggering event.

Figure 10:
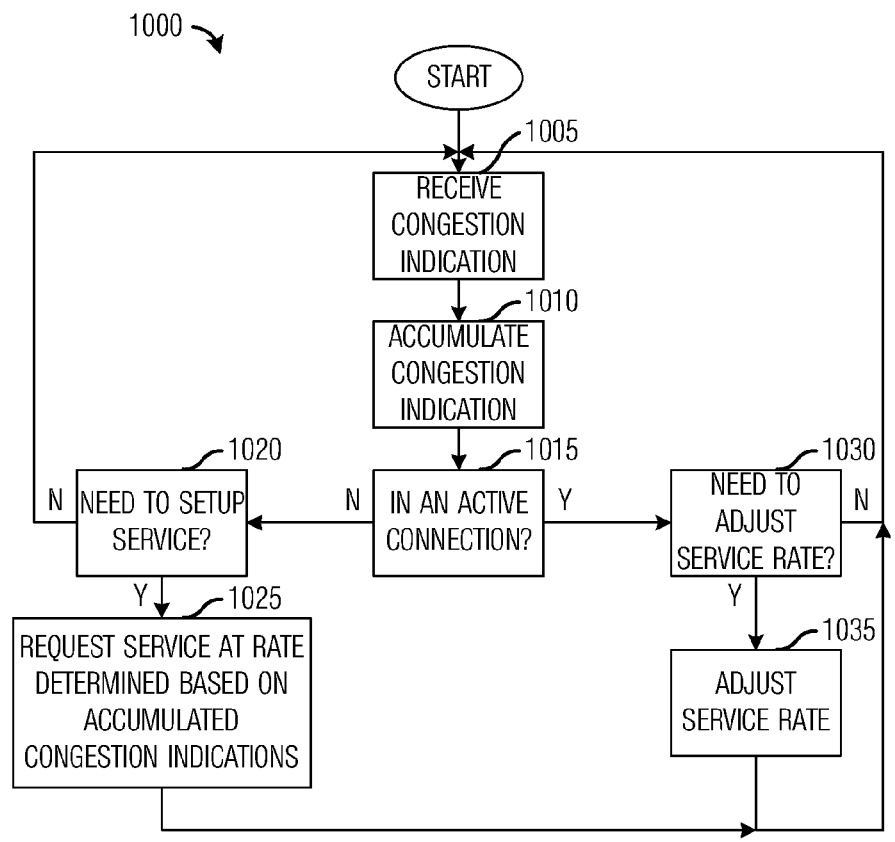
FIG. 10 is a flow diagram of operations in utilizing congestion information to determine CODEC rate.

FIG. 10 illustrates a flow diagram of operations 1000 in utilizing congestion information to determine CODEC rate. The flow diagram shown in FIG. 10 may illustrate a radio access network (RAN)-based technique for utilizing congestion information to determine CODEC rate for setup of a connection and/or adjusting CODEC rate in an active connection. Operations 1000 may be indicative of operations occurring in a UE of a communications system.

The RAN-based technique may enable fast response to changes in communications load conditions. Additionally, rate adjustments may be performed in an active connection, e.g. in the middle of the voice call, an audio/video conference, or so forth. The RAN-based technique allows for an eNB to broadcast its load conditions to UEs served by the eNB, and the UEs may accumulate the load conditions to get an estimate of eNB load conditions. Furthermore, a probabilistic approach to CODEC rate selection based on eNB load conditions may occur during connection setup or during an active connection.

Operations 1000 may begin with the UE receiving cell congestion information, such as in the form of a congestion indication, from an eNB serving the UE (block 1005). According to an embodiment, the cell congestion information may be in the form of uplink cell congestion information, downlink cell congestion information, or both. The cell congestion information may be transmitted by the eNB periodically or may be triggered by specified thresholds, such as load thresholds.

The UE may observe and accumulate the cell congestion information (block 1010). According to an embodiment, the accumulation of the cell congestion information may occur over an observation window.

The UE may perform a check to determine if the UE is in an active connection (block 1015). If the UE is not in an active connection, then the UE may perform a check to determine if the UE wishes to setup a connection (block 1020). If the UE does not wish to setup a connection, then the UE may return to block 1005 to receive additional cell congestion information.

If the UE does wish to setup a connection, then the UE may request a connection with a CODEC rate determined based on the accumulated cell congestion information (block 1025). According to an embodiment, the UE may also select a CODEC rate based on connection type. A detailed discussion of the selection of the CODEC rate is provided below. After setup of the connection with the CODEC rate, the UE may return to block 1005 to receive additional cell congestion information.

If the UE is in an active connection, the UE may then perform a check to determine if there is a need to adjust a service rate of the connection (block 1030). According to an embodiment, there may be a need to reduce the service rate of the connection if the CODEC rate of the connection exceeds the acceptable service information, an error rate of the connection exceeds an error threshold, a retry rate of the connection exceeds a retry threshold, a negative acknowledgement rate exceeds a negative acknowledgement threshold, or so forth. Alternatively, there may be a need to increase the service rate of the connection if a current CODEC rate is less than the acceptable service information, performance of the connect is below accepted standards, utilization of the communications system is below utilization threshold, desired CODEC rates provided by participants of the connection, or so on.

If the UE determines that there is a need to adjust the service rate of the connection (block 1030), then the UE may adjust the service rate based on the accumulated congestion information and the current CODEC rate of the connection (block 1035). After adjusting the service rate of the connection, the UE may return to block 1005 to receive additional cell congestion information.

Figure 11:
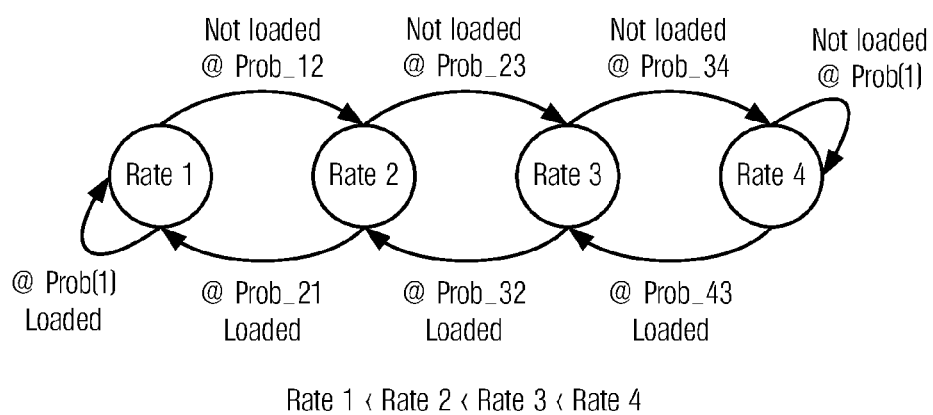
FIG. 11 is a diagram of a CODEC rate adjustment transition diagram.

FIG. 11 illustrates a CODEC rate adjustment transition diagram. The transition diagram shown in FIG. 11 may be used for transitions between four different CODEC rates: rate 1, rate 2, rate 3, and rate 4, with rate 1<rate 2<rate 3<rate 4. As an example, if a connection is at a current rate, rate 2, then the connection may be adjusted up to rate 3 if the accumulated cell congestion information indicates that the eNB is not loaded. Similarly, the connection may be adjusted down to rate 1 if the accumulated cell congestion information indicates that the eNB is loaded.

In order to help prevent a situation wherein all UEs served by the eNB adjusts their connections at the same time, a probabilistic approach may be employed, wherein a UE may adjust the rate of its connection only if a certain transition probability is met. For example, if the eNB is not loaded, a connection may have its rate adjusted from rate 2 up to rate 3 with transition probability prob_23, which also means there is a probability of (1−prob_23) that the connection will stay at rate 2. Similarly, if the eNB is loaded, a connection may have its rate adjusted from rate 2 down to rate 1 with transition probability prob_21, which also means there is a probability of (1−prob_21) that the connection will stay at rate 2. According to an embodiment, different transition probabilities may be used for up transitions and for down transitions. Similarly, different transition probabilities may be used for different up transitions or different down transitions.

Optimization of the transition probabilities may be important. The transition probabilities may be standardized or configurable by infrastructure equipment. AMR supports many different CODEC rates, therefore a number of possible combinations of rate transitions may be very large. Therefore, optimization of different transition probabilities for an exhaustive list of every possible rate transition may be tedious and may consume a considerable amount of storage space. Therefore, it may be possible to limit rate transitions to neighboring CODEC rates, i.e., transition probabilities may be optimized only for CODEC rates immediately above and below each possible CODEC rate.

Furthermore, a transition probability may be set so that it is also a function of a counter value of a number of cell congestion information received or a function of accumulated cell congestion information, i.e., a single cell congestion information indicating that the cell is loaded may cancel out a single cell congestion information indicating that the cell is not loaded. The counter value may be maintained over a period of time so that a persistent overload condition may induce a quicker rate adjustment from a UE. The counter value may be reset whenever a rate adjustment occurs.

The transition probabilities may also be a function of the communications system geometry (using averaged channel quality indicator, for example) that a UE observes so that an eNB serving the UE may maximize bandwidth savings, for example, for poor-geometry UEs, i.e., UEs with poor geometry may have a tendency to use a lower CODEC rate.

Rate adjustments may be prohibited entirely or may be limited once the CODEC rate exceeds a CODEC rate initially negotiated during connection setup. Limiting or prohibiting rate adjustments may be accomplished by setting appropriate transition probabilities to zero.

Assuming that a rate adjustment results in the CODEC rate being greater than a CODEC rate initially negotiated, there may be no need to change the UE's evolved packet system (EPS) bearer so that the CODEC rate may adapt quickly to RAN conditions during a connection without time consuming EPS negotiations. If rate adjustments are allowed, the UE knows the CODEC rate negotiate at initial call setup and may set a limit for rate adjustments.

Figures 12A, 12B:
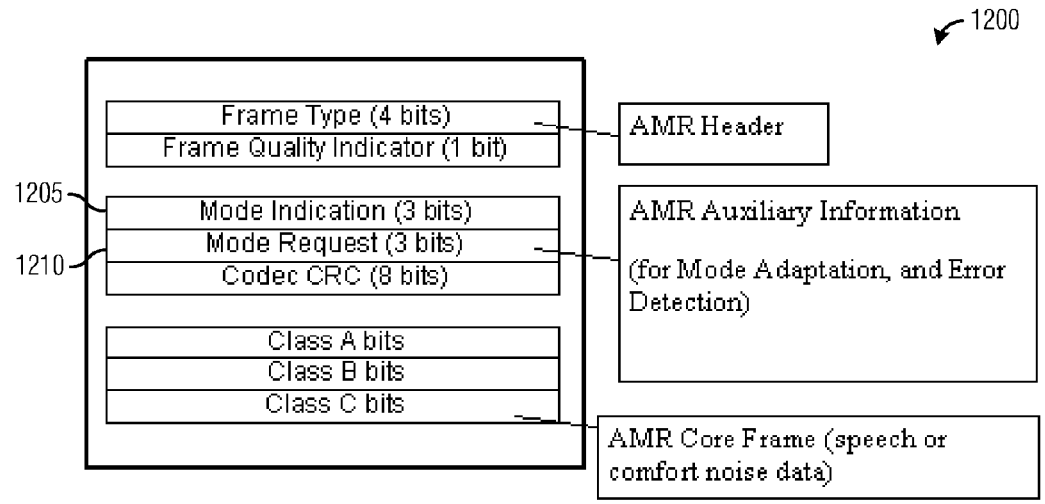
FIG. 12a is a diagram of an AMR frame header.
FIG. 12b is a diagram of available AMR CODEC rates.

According to an embodiment, within an active connection, the UE may continue to monitor the eNB's cell congestion information and elect to adjust the CODEC rate (or connection source rate) up or down based on the cell congestion information. FIG. 12*a* illustrates an AMR frame header 1200. In the AMR frame header 1200, there may be two fields that may be used in CODEC rate adjustment. A first field 1205 (CODEC mode indication (CMI)) may be used as an indication of the CODEC rate in a direction of transmission (uplink or downlink) and may be used to signal to peer network components in the connection, e.g., UEs, of a change in the CODEC rate. A second field 1210 (CODEC mode request (CMR)) may be used to request a CODEC rate change in a direction opposite of transmission with peer network components in the connection. FIG. 12*b* illustrates available AMR CODEC rates.

As discussed previously, rate adjustments may occur in both the downlink and the uplink. In downlink rate adjustment, for rate reductions, the UE may determine a desired downlink CODEC rate based on downlink cell congestion information, a set of rates supported by peers of the connection, a set of rate transition probabilities, and so forth. The UE may forward the desired downlink rate in the CMR field of an uplink AMR frame header. A CODEC encoder at the far end of the connection receives and then complies with the CMR field. The CODEC encoder may begin to send packets using the new rate, with the packets containing a new CMI value corresponding to the CODEC rate.

If semi-persistent assignments are used on the uplink, then the UE at the far end of the connection may insert padding bits in its uplink packet data unit (PDU) in order to fit the new payloads (smaller if the CODEC rate has been decreased) in the semi-persistent assignments. In addition to padding with padding bits, the UE at the far end of the connection may insert padding buffer status reports (BSR). Then, an eNB of the UE at the far end of the connection may monitor the number of padding bits or padding BSRs. If the notices a consistent use and number of padding bits/padding BSRs, then the eNB may subsequently reduce the semi-persistent assignments.

If the semi-persistent assignments are used on the downlink of a near side of the connection, then an eNB of the UE of the near side of the connection may monitor a gap between downlink data units (SDU) and a transport block size assigned to the semi-persistent assignments and may adjust the semi-persistent assignments as needed.

In uplink rate adjustment, for rate reductions, the UE may determine a desired uplink CODEC rate based on its current CODEC rate, cell congestion information, a set of rates supported by peers of the connection, a set of rate transition probabilities, and so forth.

If semi-persistent assignments are used on the uplink of the near end of the connection, the UE may transmit at the adjusted CODEC rate using previously assigned semi-persistent assignment transport blocks and resource size. The UE may indicate the adjusted CODEC rate in the CMI field in the AMR frame header. The UE may or may not insert padding BSRs in the PDU. If needed, the UE may insert padding bits. An eNB serving the UE at the near end of the connection may monitor the number of padding bits (including the padding BSRs if present) in the PDU and adjusts the semi-persistent assignment transport blocks and resource assignments by a packet data control channel if needed.

If the semi-persistent assignments are used on the downlink of the far end of the connection, then an eNB serving the UE at the far end of the connection may monitor a gap between downlink SDU size and semi-persistent assignment transport size previously assigned to associated semi-persistent assignments and adjusts the semi-persistent assignment transport blocks and resource size as needed.

In both uplink and downlink rate adjustments, if the CODEC rate is increased, the eNBs serving the UEs may monitor buffer utilization and if a consistent increase in buffer utilization is noticed, the eNBs may adjust the semi-persistent assignment transport blocks and resource size as needed.

Figure 13:
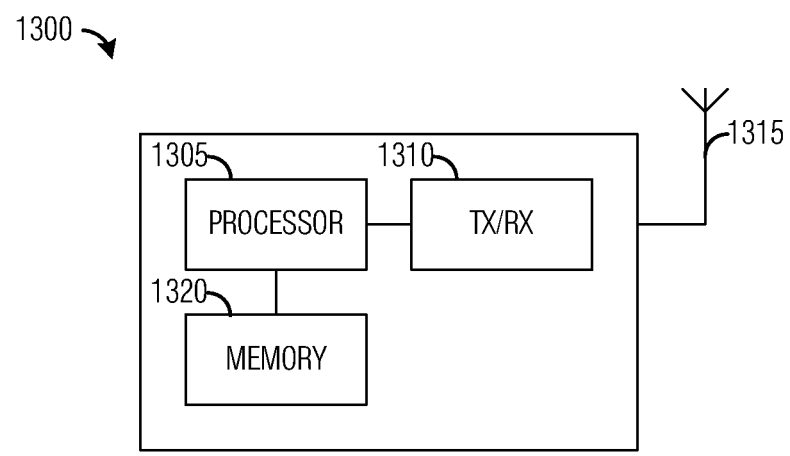
FIG. 13 is a diagram of a UE.

FIG. 13 illustrates a UE 1300. UE 1300 be used by a user to communicate with other users and/or information sources. UE 1300 may be served by an eNB. UE 1300 may include a processor 1305 that may be used to run applications and programs. Furthermore, processor 1305 may be used to process congestion information from the eNB serving UE 1300. As an example, UE 1300 may accumulate the congestion information over an observation window of time, wherein UE 1300 may simply add up the congestion information to arrive at the accumulated congestion information.

Processor 1305 may also be used adjust a data rate of an active connection in which UE 1300 is participating. The adjusting of the data rate of the active connection may be based on the accumulated congestion information as well as transition probabilities. A discussion of a probability based adjusting of the data rate was described previously. Processor 305 may make use of a random number generator to generate a random number for use in adjusting the data rate of an active connection.

Processor 1305 may also be used to determine a data rate for a connection request. The determining of the data rate for the connection request may also be based on the accumulated congestion information. Furthermore, UE 1300 may also make use of transition probabilities to determine the data rate for the connection request.

UE 1300 also includes a transmitter/receiver (TX/RX) 1310 that may be used to transmit and/or receive information over an antenna 1315. UE 1300 also includes a memory 1320 that may be used to store information, such as the accumulated congestion information, the transition probabilities, random numbers, and so forth.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for forming connections, the method comprising:
    receiving, by a network device, a service authorization request indirectly from a user equipment (UE), wherein the service authorization request requests establishment of a connection between the UE and an access point (AP) at a requested data rate;
    sending, by the network device, a first request directly or indirectly to the AP, the first request requesting formation of a bearer at the requested data rate between the UE and the AP;
    receiving, by the network device, a first response directly or indirectly from the AP, the first response indicating that the request for formation of the bearer at the requested data rate was denied; and
    pursuant to receiving the first response, sending, by the network device, a second request directly or indirectly to the AP without notifying the UE that the request for formation of the bearer at the requested data rate was denied, the second request requesting formation of the bearer at a first alternative data rate, wherein the first alternative data rate is lower than the requested data rate, and wherein the bearer is formed between the UE and the AP at the first alternative data rate if the request for formation of the bearer at the first alternative data rate is approved.

2. The method of claim 1 further comprising:
    identifying the first alternative data rate, wherein the first alternative data rate is computed in accordance with a communications system load.

3. The method of claim 1 further comprising:
    receiving, by the network device, a second response directly or indirectly from the AP, the second response indicating that attempted formation of the bearer at the first alternative data rate was denied; and
    sending, by the network device, a third request directly or indirectly to the AP without notifying the UE that the attempted formation of the bearer at the requested data rate and at the first alternative data rate was denied, the third request requesting formation of the bearer at a second alternative data rate, wherein the second alternative data rate is lower than the first alternative data rate, and wherein the bearer is formed between the UE and the AP at the second alternative data rate if the request for formation of the bearer at the second alternative data rate is approved.

4. The method of claim 3, wherein the network device comprises an applications function of a communications system.

5. The method of claim 3, wherein the network device comprises a policy and charging rules function of a communications system.

6. The method of claim 1, further comprising:
receiving, by the network device, a second response from the AP, the second response indicating that the request for formation of the bearer at the first alternative data rate was approved; and
sending, by the network device, a modified service authorization response to the UE, the modified service authorization response indicating that formation of the bearer has been approved at the first alternative data rate.

7. The method of claim 6, wherein the network device is configured to send the modified service authorization response to the UE without first notifying the UE that the request for formation of the bearer at the requested data rate was denied.

8. The method of claim 6, wherein the first request and second request comprises diameter request messages, and wherein the first response and the second response comprise diameter response messages.

9. A network device comprising:
a processor; and
a non-transitory computer readable storage medium storing programming for execution by the processor, the programming including instructions to:
receive a service authorization request directly or indirectly from a user equipment (UE), wherein the service authorization request requests establishment of a connection between the UE and an access point (AP) at a requested data rate;
send a first request directly or indirectly to the AP, the first request requesting formation of a bearer at the requested data rate between the UE and the AP;
receive a first response directly or indirectly from the AP, the first response indicating that the request for formation of the bearer at the requested data rate was denied; and
send a second request directly or indirectly to the AP, the second request requesting formation of the bearer at a first alternative data rate, the second request being sent by the network device without notifying the UE that the request for formation of the bearer at the requested data rate was denied, wherein the first alternative data rate is lower than the requested data rate, and wherein the bearer is formed between the UE and the AP at the first alternative data rate if the request for formation of the bearer at the first alternative data rate is approved.

10. The network device of claim 9, wherein the programming further includes instructions to:
receive a second response from the AP, the second response indicating that the request for formation of the bearer at the first alternative data rate is approved; and
send a modified service authorization response to the UE, the modified service authorization response indicating that formation of the bearer has been approved at the first alternative data rate.

11. The network device of claim 10, wherein the network device is configured to send the modified service authorization response to the UE without first notifying the UE that the request for formation of the bearer at the requested data rate was denied.

12. The network device of claim 10, wherein the first request and second request comprises diameter request messages, and wherein the first response and the second response comprise diameter response messages.

* * * * *